(12) United States Patent
Choi et al.

(10) Patent No.: US 10,832,867 B2
(45) Date of Patent: Nov. 10, 2020

(54) DIELECTRIC COMPOSITION AND ELECTRONIC COMPONENT USING THE SAME

(71) Applicant: SAMSUNG ELECTRO-MECHANICS CO., LTD., Suwon-si (KR)

(72) Inventors: Min Young Choi, Suwon-si (KR); Hyoung Uk Kim, Suwon-si (KR); Ki Myoung Yun, Suwon-Si (KR); Tae Young Ham, Suwon-si (KR); Hyung Soon Kwon, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 64 days.

(21) Appl. No.: 16/143,231

(22) Filed: Sep. 26, 2018

(65) Prior Publication Data

US 2020/0043658 A1 Feb. 6, 2020

(30) Foreign Application Priority Data

Aug. 6, 2018 (KR) .................. 10-2018-0091105

(51) Int. Cl.
*H01G 4/12* (2006.01)
*H01G 4/012* (2006.01)
(Continued)

(52) U.S. Cl.
CPC ........... *H01G 4/1245* (2013.01); *C04B 35/49* (2013.01); *H01G 4/008* (2013.01); *H01G 4/012* (2013.01);
(Continued)

(58) Field of Classification Search
CPC ...... H01G 4/248; H01G 4/012; H01G 4/1209; H01G 4/2325; H01G 4/30; H01G 4/0085;
(Continued)

(56) References Cited

U.S. PATENT DOCUMENTS

2003/0125192 A1* 7/2003 Moon ............... B32B 18/00
501/135
2010/0165541 A1 7/2010 Sasabayashi et al.
(Continued)

FOREIGN PATENT DOCUMENTS

JP 5182531 B2 4/2013
KR 10-2003-0056241 A 7/2003
(Continued)

OTHER PUBLICATIONS

Korean Office Action dated Aug. 29, 2019 issued in Korean Patent Application No. 10-2018-0091105 (with English translation).

*Primary Examiner* — Michael P McFadden
(74) *Attorney, Agent, or Firm* — Morgan, Lewis, Bockius LLP

(57) ABSTRACT

A dielectric composition includes: a base material powder including $(Ca_{1-x}Sr_x)(Zr_{1-y}Ti_y)O_3$ ($0<x\leq0.7$, $0<y\leq0.03$); a first subcomponent including at least one selected from the group of an oxide of manganese (Mn) and a carbonate of manganese (Mn); a second subcomponent including at least one selected from the group of an oxide of yttrium (Y) and a carbonate of yttrium (Y), where a content of the second subcomponent is within a range from 2 to 3 mol, based on 100 mol of the base material powder; and a third subcomponent including at least one selected from the group of an oxide of silicon (Si) and a carbonate of silicon (Si), and an electronic component uses the same.

10 Claims, 4 Drawing Sheets

(51) Int. Cl.
 *H01G 4/248* (2006.01)
 *H01G 4/232* (2006.01)
 *H01G 4/008* (2006.01)
 *C04B 35/49* (2006.01)

(52) U.S. Cl.
 CPC ............. *H01G 4/232* (2013.01); *H01G 4/248* (2013.01); *C04B 2235/3224* (2013.01); *C04B 2235/3225* (2013.01); *C04B 2235/3249* (2013.01); *C04B 2235/3262* (2013.01); *C04B 2235/3418* (2013.01); *C04B 2235/442* (2013.01); *C04B 2235/96* (2013.01)

(58) Field of Classification Search
 CPC .... H01G 4/1227; H01G 4/1245; H01G 4/008; H01G 4/242; C04B 35/49; C04B 2235/3224; C04B 2235/3225; C04B 2235/3249; C04B 2235/3262; C04B 2235/3418; C04B 2235/442; C04B 2235/96
 See application file for complete search history.

(56) References Cited

U.S. PATENT DOCUMENTS

2017/0008806 A1* 1/2017 Yoon .................. H01G 4/30
2017/0200557 A1 7/2017 Symes, Jr.

FOREIGN PATENT DOCUMENTS

| KR | 10-1136004 B1 | 4/2012 |
|---|---|---|
| KR | 10-2017-0005646 A | 1/2017 |
| KR | 10-2018-0011162 A | 1/2018 |

* cited by examiner

DIELECTRIC COMPOSITION AND ELECTRONIC COMPONENT USING THE SAME

CROSS-REFERENCE TO RELATED APPLICATION(S)

This application claims the benefit of priority to Korean Patent Application No. 10-2018-0091105 filed on Aug. 6, 2018 in the Korean Intellectual Property Office, the disclosure of which is incorporated herein by reference in its entirety.

BACKGROUND

1. Field

The present disclosure relates to a dielectric composition and an electronic component using the same.

2. Description of Related Art

A multilayer ceramic capacitor, an inductor, a piezoelectric element, a varistor, a chip resistor and a thermistor are electronic components using a dielectric material.

The electronic component has various sizes and forms depending on the use and the capacity thereof, and in order to meet requirements for miniaturization, weight reduction and multifunctionalization which are recent trends in electronic products, microminiaturization, having an ultra-high capacity, boosting and the like are required.

Thus, the electronic component may have a thinner dielectric layer for microminiaturization, and be manufactured by laminating as many internal electrodes as possible for having an ultra-high capacity.

However, when the thickness of the dielectric layer is decreased, and boosting is performed, strength of an electrical field applied to the dielectric layer becomes higher by the boosting, and thus, a DC-bias property may be deteriorated.

In addition, voltage (V/m) applied between layers is increased due to a decreased thickness of the dielectric layer, and defects in a microstructure occur to deteriorate voltage withstand characteristics such as insulation resistance (IR: insulation resistance), thereby lowering reliability of electronic components.

SUMMARY

An aspect of the present disclosure may provide a dielectric composition capable of improving a capacity, a dielectric constant and reliability, and an electronic component using the same.

According to an aspect of the present disclosure, a dielectric composition may include a base material powder including $(Ca_{1-x}Sr_x)(Zr_{1-y}Ti_y)O_3$ ($0<x\leq0.7$, $0<y\leq0.03$); a first subcomponent including manganese (Mn) oxide or carbonate; a second subcomponent including 2 to 3 mol of yttrium (Y) oxide or carbonate, based on 100 mol of the base material powder; and a third subcomponent including silicon (Si) oxide or carbonate.

According to another aspect of the present disclosure, a dielectric composition may include a base material powder including $(Ca_{1-x}Sr_x)(Zr_{1-y}Ti_y)O_3$ ($0<x\leq0.7$, $0<y\leq0.03$); a first subcomponent including manganese (Mn) oxide or carbonate; second subcomponent including 2 to 3 mol of dysprosium (Dy), based on 100 mol of the base material powder; and a third subcomponent including silicon (Si) oxide or carbonate.

In an exemplary embodiment of the present disclosure, a ratio of a content of the second subcomponent to a content of the first subcomponent may be within a range from 0.6 to 1.0.

According to another aspect of the present disclosure, an electronic component may include a body including a plurality of dielectric layers and an internal electrode; and an external electrode disposed to be connected to the internal electrode in the body, wherein the dielectric layer includes the dielectric composition.

In an exemplary embodiment of the present disclosure, the dielectric layer may have a ratio of a content of the second subcomponent to a content of the first subcomponent within a range from 0.6 to 1.0.

In an exemplary embodiment of the present disclosure, the internal electrode may include nickel (Ni) or a Ni alloy.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

The present disclosure relates to a dielectric composition, and an electronic component including the dielectric composition according to the exemplary embodiment of the present disclosure may include a multilayer capacitor, an inductor, a piezoelectric element, a varistor, a chip resistor, a thermistor, and the like, and hereinafter, the multilayer capacitor will be described as an example of an electronic product.

Hereinafter, directions of a body 110 will be defined in order to clearly describe the exemplary embodiments of the present disclosure. X, Y and Z in the accompanying drawings refer to a length direction, a width direction, and a thickness direction of the body 110, respectively.

In addition, in the present exemplary embodiment, a Z direction may be used in the same concept as a lamination direction in which dielectric layers are laminated.

Figure 1:
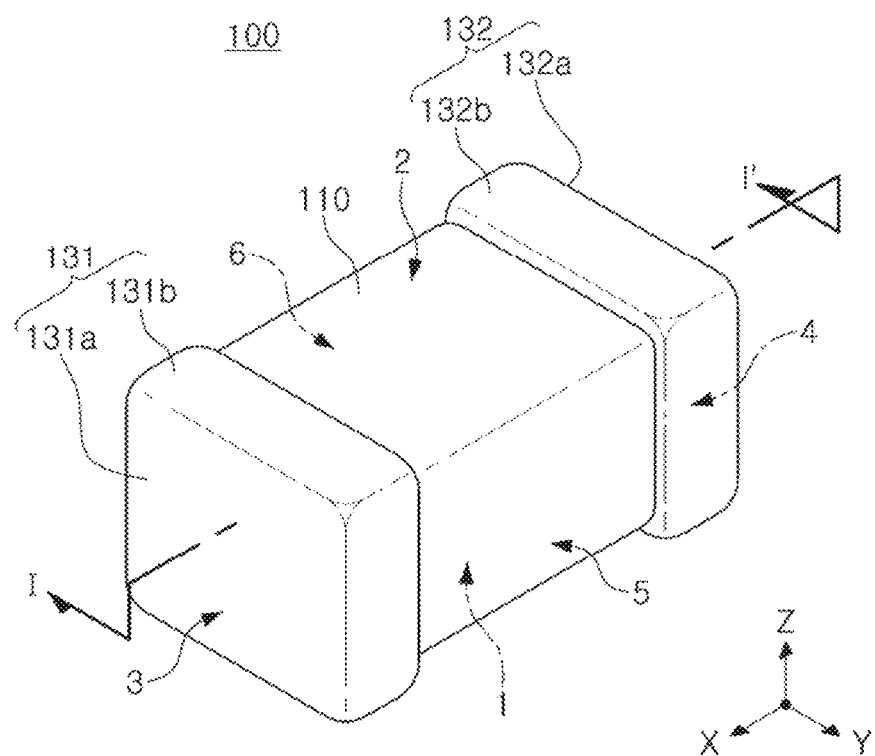
FIG. 1 is a perspective view schematically showing an electronic component according to an exemplary embodiment of the present disclosure.
Figure 2:
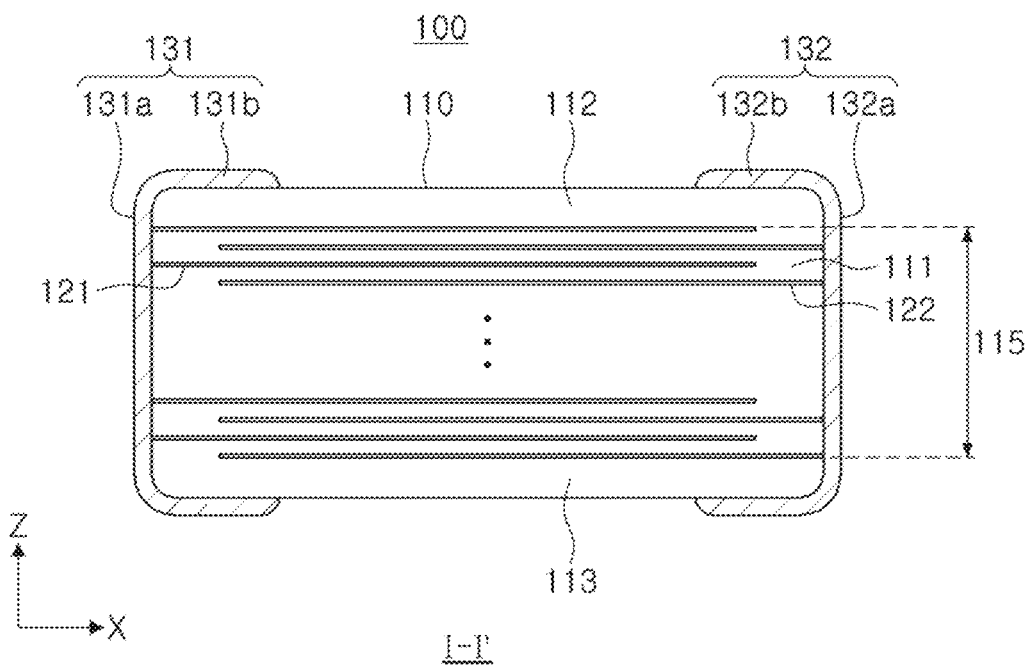
FIG. 2 is a cross-sectional view taken along line I-I' of FIG. 1.
Figure 3:
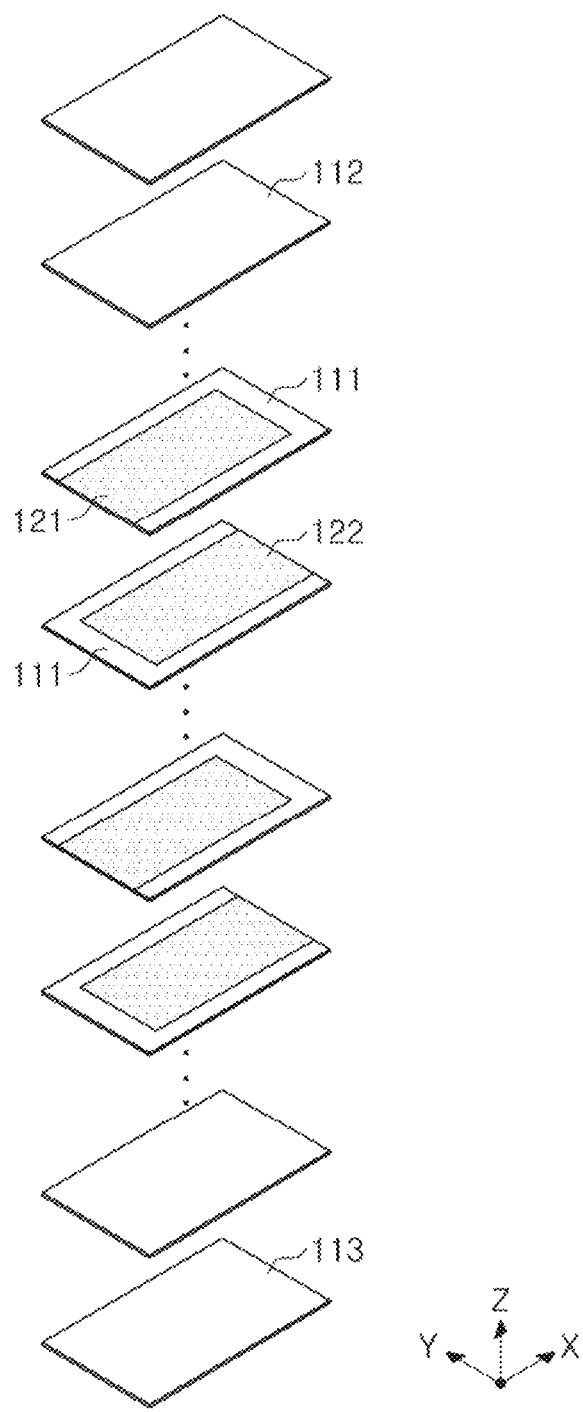
FIG. 3 is a separated perspective view schematically showing a capacitor body of FIG. 1.

Referring to FIGS. 1 to 3, a multilayer capacitor 100 according to the present exemplary embodiment includes a body 110 including a plurality of dielectric layers 111, and first and second internal electrodes 121 and 122, and first and second external electrode 131 and 132.

The body 110 is obtained by laminating a plurality of dielectric layers 111 in the Z direction and sintering the laminated product, and a boundary between the dielectric layers 111 of the body 110 adjacent to each other may be integrated so that the boundary is difficult to be confirmed without using a scanning electron microscope (SEM).

Here, though the body 110 does not have a particularly limited shape, the body may largely have a rectangular parallelepiped shape, but the present disclosure is not limited thereto.

In addition, the shape and dimension of the body 110, and the number of the laminated dielectric layers 111 are not limited to those illustrated in the drawings of the present exemplary embodiment.

In the present exemplary embodiment, for convenience of description, both surfaces opposing to each other in the Z direction of the body 110 are defined as first and second surfaces 1 and 2, both surfaces connected to the first and second surfaces 1 and 2 and opposing to each other in the X direction are defined as a third and fourth surfaces 3 and 4, and both surfaces connected to the first and second surfaces 1 and 2, connected to the third and fourth surfaces 3 and 4 and opposing to each other in the Y direction are defined as a fifth and sixth surfaces 5 and 6.

In addition, in the present exemplary embodiment, a mounting surface of the multilayer capacitor 100 may be the first surface 1 of the body 110.

In addition, the body 110 may include an active region 115 as a portion contributing to capacity formation of a capacitor, and upper and lower covers 112 and 113 formed in upper and lower portions, respectively of the active region 115 in the Z direction as upper and lower margin portions.

The upper and lower covers 112 and 113 may have the same material and the same configuration as the dielectric layer 111 except that the covers do not include the internal electrodes.

Here, the upper and lower covers 112 and 113 may be formed by laminating a single dielectric layer or two or more dielectric layers on upper and lower surfaces of the active region 115 in the Z direction, respectively, and basically may serve to prevent damage to the first and second internal electrodes 121 and 122 due to physical or chemical stress.

The first and second internal electrodes 121 and 122 are the electrodes to which different polarities from each other are applied, and alternately disposed along the Z direction with the dielectric layer 111 interposed therebetween, and one end of the internal electrodes may be exposed, respectively, through the third and fourth surfaces 3 and 4 of the body 110.

Here, the first and second internal electrodes 121 and 122 may be electrically insulated from each other by the dielectric layer 111 disposed therebetween.

In addition, the end portions of the first and second internal electrodes 121 and 122 which are alternately exposed through the third and fourth surfaces 3 and 4 of the body 110 may be connected to the first and second external electrode 131 and 132 disposed on the third and fourth surfaces 3 and 4 of the body 110, respectively, to be electrically connected.

According to the above configuration, when a predetermined voltage is applied to the first and second external electrodes 131 and 132, charge is accumulated between the first and second internal electrodes 121 and 122.

Here, capacitance of the multilayer capacitor 100 is proportional to an overlapping area of the first and second internal electrodes 121 and 122 overlapping each other along the Z direction in the active region 115.

In addition, the first and second internal electrodes 121 and 122 may include nickel (Ni) or a nickel alloy.

The Ni alloy may include one or more elements selected from the group consisting of manganese (Mn), chromium (Cr), cobalt (Co), sulfur (S), tin (Sn) and aluminum (Al).

The first and second external electrode 131 and 132 provide voltages having different polarities from each other, are disposed in both end portions in the X direction of the body 110, respectively, and connected to the end portion of the first and second internal electrodes 121 and 122 exposed through the third and fourth surfaces 3 and 4 of the body 110 to be electrically connected, thereby forming a capacitor circuit.

Here, a conductive material included in the first and second external electrodes 131 and 132 is not particularly limited, but nickel (Ni), copper (Cu), or an alloy thereof having excellent conductivity may be used.

In addition, the first and second external electrodes 131 and 132 may include a conductive layer formed on the third and fourth surfaces 3 and 4 of the body 110, and a plated layer formed on the conductive layer.

The plated layer may include a nickel (Ni) plated layer and a tin (Sn) plated layer formed on the nickel (Ni) plated layer.

In addition, the first external electrode 131 may include a first head portion 131a and a first band portion 131b.

The first head portion 131a is a portion formed on the third surface 3 of the body 110 to be connected to the first internal electrode 121, and the first band portion 131b is a portion extending from the first head portion 131a to a portion of the first surface 1 of the body 110.

Here, the first band portion 131b may be further extended to a portion of the fifth and sixth surfaces 5 and 6 and a portion of the second surface 2 of the body 110 for improving fixation strength and the like.

In addition, the second external electrode 132 may include a second head portion 132a and a second band portion 132b.

The second head portion 132a is a portion formed on the fourth surface 4 of the body 110 to be connected to the second internal electrode 122, and the second band portion 132b is a portion extending from the second head portion 132a to a portion of the first surface 1 of the body 110.

Here, the second band portion 132b may be further extended to a portion of the fifth and sixth surfaces 5 and 6 and a portion of the second surface 2 of the capacitor body 110 for improving fixation strength and the like.

In the present exemplary embodiment, the dielectric layer 111 included in the body 110 may contain a reduction resistant dielectric composition, and the dielectric composition is a COG composition specified in an EIA specification.

The dielectric composition according to the present exemplary embodiment includes a base material powder including $(Ca_{1-x}Sr_x)(Zr_{1-y}Ti_y)O_3$ ($0<x\leq0.7$, $0<y\leq0.03$) modified by partially solid-solubilizing calcium (Ca), strontium (Sr), zirconium (Zr) and titanium (Ti); a first subcomponent including manganese (Mn) oxide or carbonate; a second subcomponent including 2 to 3 mol of yttrium (Y) or dysprosium (Dy), based on 100 mol of the base material powder; and a third subcomponent including silicon (Si) oxide or carbonate.

When the dielectric layer 111 is formed of the dielectric composition, sintering in a reduction atmosphere at 1,300° C. or less becomes possible, and thus, nickel (Ni) or a Ni alloy may be used as a material of the first and second internal electrodes 121 and 122.

Therefore, excellent cold crystallization temperature (TCC) and a DC-bias property may be possessed, and high reliability may be secured.

Hereinafter, each component of the dielectric composition according to the exemplary embodiment of the present disclosure will be described in detail.

a) Base Material Powder

The base material powder is a main component of a dielectric, and includes $(Ca_{1-x}Sr_x)(Zr_{1-y}Ti_y)O_3$ modified by partially solid-solubilizing calcium (Ca), strontium (Sr), zirconium (Zr) and titanium (Ti) (hereinafter, referred to as "CSZT"). Here, a dielectric constant is varied linearly in proportion to a ratio of x or y, and as x or y is increased, the dielectric constant is also increased in proportion thereto. However, in order to satisfy the COG properties, it is necessary to control the dielectric constant at an appropriate level, and x may be, for example, within a range from greater than 0 to 0.7, and y may be, for example, within a range from greater than 0 to 0.03.

b) First Subcomponent

The first subcomponent may include manganese (Mn) oxide or carbonate.

The form of the manganese oxide or carbonate is not particularly limited.

In addition, the first subcomponent may serve to impart reduction resistance, improve microstructural densification, and maintain a stable high temperature accelerated life.

c) Second Subcomponent

As the second subcomponent, an oxide or carbonate of yttrium (Y) or dysprosium (Dy) which is a rare earth element may be included.

The form of the Y or Dy oxide or carbonate is not particularly limited.

In addition, the second subcomponent may serve to control grain growth and uniformize a grain distribution, thereby improving reliability.

Here, the second subcomponent may be included at 2 to 3 mol, based on 100 mol of the base material powder.

d) Third Subcomponent

The third subcomponent may include silicon (Si) oxide or carbonate.

The form of the Si oxide or carbonate is not particularly limited.

In addition, the third subcomponent serves as a sintering aid, and may serve to lower a sintering temperature and react with at least one or more of the base material powder as the main component, the first subcomponent and the second subcomponent, thereby promoting sinterability.

The conventional dielectric used in electronic components is manufactured by solid-solubilizing calcium (Ca), manganese (Mn), magnesium (Mg) and rear earth elements in barium titanate ($BaTiO_3$) as the main component.

However, since the material has ferroelectric properties, a dielectric loss due to an aging phenomenon may occur as the use time accumulates.

Here, when the thickness of the dielectric layer is decreased, and boosting is performed, electrical field strength applied to the dielectric layer becomes higher by the boosting, thereby deteriorating a DC-bias property.

In addition, voltage (V/m) applied between layers is increased due to a decreased thickness, and defects in a microstructure occur to deteriorate voltage withstand characteristics such as insulation resistance (IR: insulation resistance), thereby lowering reliability of electronic components.

Meanwhile, the dielectric layer of the multilayer capacitor may include ceramic particles (crystal grains) and an intergranular portion (grain boundary) present between the ceramic particles.

In order to improve reliability of a dielectric material C0G properties, it is necessary to increase a fraction of a grain boundary to secure a relatively large number of grain boundaries, thereby preventing a reduction in insulation resistance (IR).

When comparing resistance in the dielectric, it is known that a resistance value in the grain boundary is higher than a resistance value in the grain.

The reason why the resistance value in the grain boundary is higher than the resistance value in the grain may be explained by a Schottky barrier model in an interface region.

In general, in the close vicinity of the grain boundary, a space charge layer in which an ion or electron concentration is high, that is, a depletion layer is formed, and when a certain element is distributed at a high concentration in the grain boundary, a Fermi level is raised, and a Schottky barrier height is increased, thereby increasing the depletion layer.

Accordingly, since a tunneling phenomenon of a charge carrier by thermionic activation is suppressed, an effect of increasing reliability may be expected.

In the present exemplary embodiment, in determining the composition and content of the dielectric composition, the composition and content of rare earth elements (hereinafter, referred to as "RE") are suggested, which may lower charge density or raise the fraction of the grain boundary at the time of solid solubilization or grain boundary segregation in CSZT, thereby allowing reliability improvement to be expected.

In particular, a content ratio of Mn-RE-Si is optimized so that both densification and uniform grain growth control may be secured, but Y or Dy is used as RE, thereby improving insulation resistance (IR) degradation at high temperature.

In a C0G electronic component using the CSZT base material powder of the present exemplary embodiment, detection of the rare earth elements may be confirmed by a transmission electron microscope (TEM) or ICP (emission spectrometry).

Figure 4A:
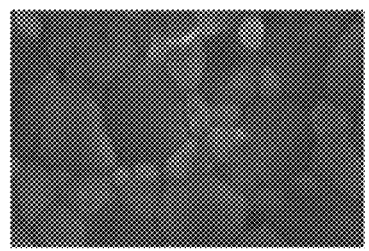
FIGS. 4A to 4C are scanning electron microscope (SEM) photographs representing a conventional dielectric layer and a dielectric layer by an exemplary embodiment of the present disclosure, respectively.
Figure 4B:
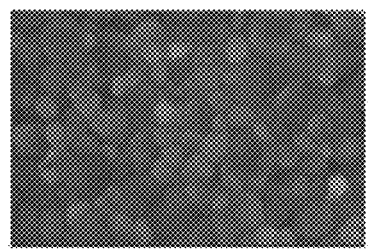
Figure 4C:
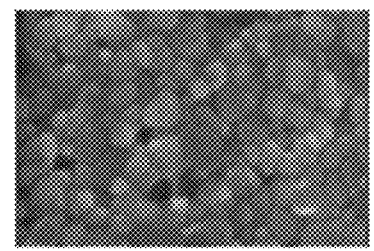

FIG. 4A is a TEM photograph representing the conventional dielectric layer, FIG. 4B is a TEM photograph representing the dielectric layer including Dy of Example 1 of the present disclosure, and FIG. 4C is a TEM photograph representing the dielectric layer including Y of Example 2 of the present disclosure.

Referring to FIGS. 4A to 4C, it was confirmed that by changing the composition of the conventional dielectric layer including Mn, Zr and Si to the compositions of the dielectric layer including Mn, Dy and Si, and Mn, Y and Si, respectively, the grain growth in Examples 1 and 2 of the present disclosure is suppressed by an increased grain boundary fraction, as compared with the Comparative Example, thereby securing a uniform microstructure.

Figure 5:
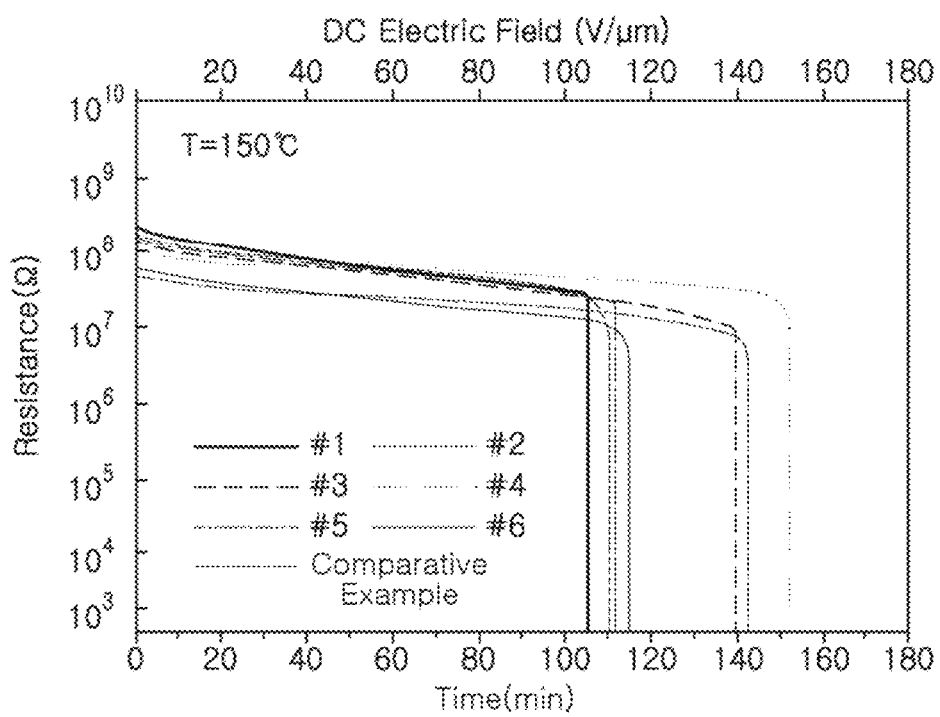
FIG. 5 is a graph representing reliability of a multilayer capacitor using a conventional dielectric composition and a multilayer capacitor using a dielectric composition including Dy of the present disclosure.
Figure 6:
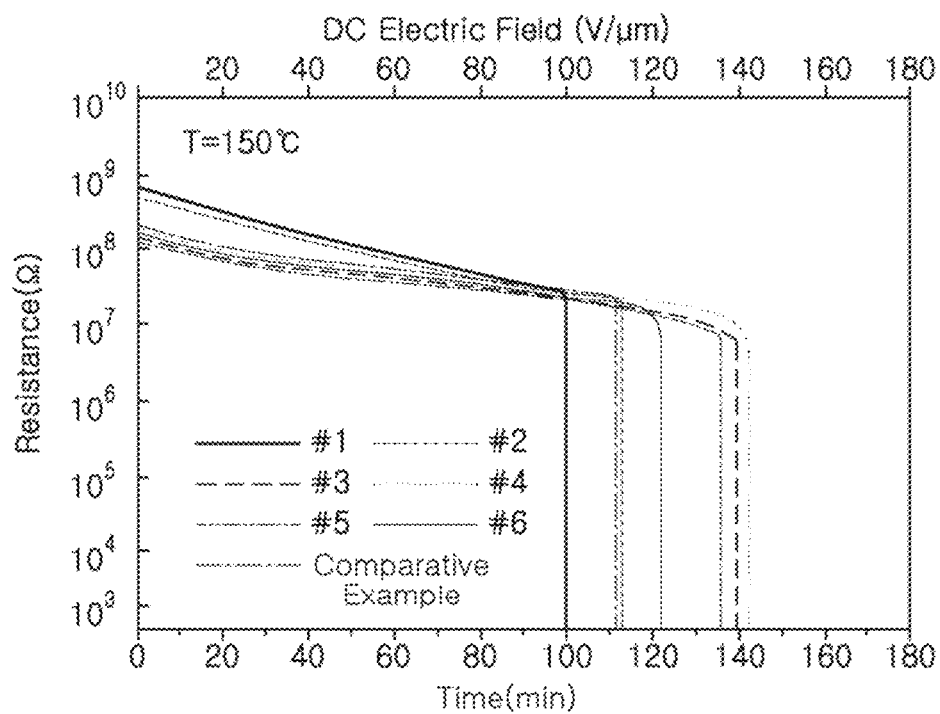
FIG. 6 is a graph representing reliability of a multilayer capacitor using a conventional dielectric composition and a multilayer capacitor using a dielectric composition including Y of the present disclosure.

FIG. 5 is a graph representing reliability of a multilayer capacitor using the conventional dielectric composition and a multilayer capacitor using a dielectric composition including Dy of the present disclosure, and FIG. 6 is a graph representing reliability of a multilayer capacitor using a conventional dielectric composition and a multilayer capacitor using a dielectric composition including Y of the present disclosure.

Here, Comparative Example is for comparison while Zr is varied between 0.29 mol-1.5 mol in a Mn—Zr—Si series which is a conventionally used composition system, #1 used 1.0 mol of Dy or Y, #2 used 1.5 mol of Dy or Y, #3 used 2.0 mol of Dy or Y, #4 used 2.5 mol of Dy or Y, #5 used 3.0 mol of Dy or Y, and #6 used 3.5 mol of Dy or Y.

Referring to FIGS. 5 and 6, in Examples 1 and 2 of the present disclosure, it was confirmed that the IR degradation was improved by 25% or more as compared with the Comparative Example, by greatly decreasing a side effect of a raised sintering temperature in the equivalent electrical properties, and increasing reliability due to increased grain boundary resistance and fraction.

Therefore, as in the present exemplary embodiment, the high temperature reliability of electronic products may be improved by using Dy or Y of a rare earth series as the second subcomponent, and setting the optimal composition thereof to 2 to 3 mol, based on 100 mol of the base material powder.

EXPERIMENTAL EXAMPLES

Hereinafter, the present disclosure will be described in detail by the Examples and the Comparative Examples, however, these are for better understanding of the present disclosure, and the scope of the present disclosure is not limited to the following Examples.

The manufacturing process of the multilayer capacitor used in the experiment is as follows:

First, as the base material powder of the dielectric composition, CSZT having a 100 nm grade of an average particle size was used, and Mn was added as the first subcomponent, and Si was added as the third subcomponent thereto.

As the second subcomponent, Zr was added in the Comparative Example, Dy was added in Example 1, and Y was added in Example 2.

Here, the first to third subcomponents were added in the form of oxide or carbonate.

In addition, in the present experiment, after the base material powder and the first to third subcomponent powder particles were prepared according to the composition and content listed in Table 1, the powder particles were mixed with a dispersant, using a zirconia ball as a mixing and dispersing media, and ethanol and toluene as a solvent, and then subjected to ball milling for about 20 hours, and thereafter, a binder was mixed therewith for implementing strength of a dielectric sheet, thereby manufacturing slurry.

Next, the thus-prepared slurry was formed into a sheet having a thickness of 1.0-1.5 μm, using a small doctor blade type coater.

Next, the internal electrode was printed with Ni on the formed sheet, and then 30 sheets having a thickness of 3 μm were laminated on the upper and lower covers, respectively to prepare a laminate, which is subject to a compression process to manufacture a bar.

Then, the bar was cut into a chip having a size of 1.0 mm length×0.5 mm width using a cutter.

Next, the chip was calcined in an atmosphere at 400° C. for removing the binder, and then sintered for about 1 hour under the condition of a temperature of about 1,300° C. or less and a hydrogen ($H_2$) concentration of 2.0% or less.

Thereafter, a termination process and electrode sintering were performed with copper (Cu) paste to complete the multilayer capacitor of C0G properties.

Then, the electrical properties such as microstructural uniformity, a dielectric constant and high temperature reliability of the multilayer capacitor were measured for each specimen.

[Evaluation]

The microstructural uniformity and the high temperature reliability of the multilayer capacitor varied depending on the content of the first and third subcomponents and the composition and content of the second subcomponent were measured, and are shown in Table 1 below.

Here, the microstructural uniformity is represented as follows: when a grain size was measured at a ×30000 magnification using SEM, the case where a particle size based on D50 is 500 nm or more is determined as x, the case where a particle size based on D50 is more than 300 nm and less than 500 nm is determined as Δ, and the case where a particle size based on D50 is 350 nm or less is determined as ○.

In a high temperature reliability test (high accelerated life test) for measuring the high temperature reliability, 40 samples were taken for each specimen, and high temperature withstand voltage (V/μm) was measured under the condition of increasing an electrical field at 5 V/μm per 5 minutes at 150° C.

The high temperature withstand voltage refers to the voltage at which insulation resistance withstands $10^5 \Omega$ or more.

Here, the case where the high temperature withstand voltage (V/μm) is 110 V/μm or less is defined as x, the case where V/μm is more than 110 V/μm and less than 130 V/μm is defined as Δ, and the case where V/μm is 130 V/μm or more is defined as ○.

TABLE 1

| | Moles of added subcomponents based on 100 mol of base material powder | | | | Ratio Second | Electrical properties | | |
|---|---|---|---|---|---|---|---|---|
| | First subcomponent | Second subcomponent | | Third subcomponent | subcomponent/ first | Microstructural uniformity | Dielectric | High temperature |
| Specimen | Mn | Zr | Dy Y | Si | subcomponent | D50 | constant | reliability |
| 1 | 4.5 | 0.29 | | 2.64 | 0.064 | x | 28.6 | Δ |
| 2 | 3.5 | 0.29 | | 2.64 | 0.083 | Δ | 29.5 | Δ |
| 3 | 3 | 0.29 | | 2.64 | 0.097 | Δ | 30.1 | x |
| 4 | 2 | 0.29 | | 2.64 | 0.145 | Δ | 30.8 | x |
| 5 | 4.5 | 0.29 | | 1.47 | 0.064 | Δ | 29.5 | Δ |
| 6 | 3.5 | 0.29 | | 1.47 | 0.083 | Δ | 29.8 | Δ |
| 7 | 3 | 0.29 | | 1.47 | 0.097 | Δ | 30.5 | x |

TABLE 1-continued

| | Moles of added subcomponents based on 100 mol of base material powder | | | | Ratio Second subcomponent/ first subcomponent | Microstructural uniformity | Electrical properties | |
|---|---|---|---|---|---|---|---|---|
| | First subcomponent | Second subcomponent | | Third subcomponent | | | Dielectric | High temperature |
| Specimen | Mn | Zr | Dy   Y | Si | | D50 | constant | reliability |
| 8 | 2 | 0.29 | | 1.47 | 0.145 | Δ | 30.6 | x |
| 9 | 3 | 1 | | 1.47 | 0.333 | Δ | 28.2 | Δ |
| 10 | 3 | 1.5 | | 1.47 | 0.500 | Δ | 27.6 | Δ |
| 11 | 3 | | 1 | 1.47 | 0.333 | x | 30.8 | x |
| 12 | 3 | | 1.5 | 1.47 | 0.500 | o | 30.5 | Δ |
| 13 | 3 | | 2 | 1.47 | 0.667 | o | 30.2 | o |
| 14 | 3 | | 2.5 | 1.47 | 0.833 | o | 30.1 | o |
| 15 | 3 | | 3 | 1.47 | 1.000 | o | 29.8 | o |
| 16 | 3 | | 3.5 | 1.47 | 1.167 | Δ | 29.5 | Δ |
| 17 | 3 | |    1 | 1.47 | 0.333 | x | 30.7 | x |
| 18 | 3 | |    1.5 | 1.47 | 0.500 | o | 30.4 | Δ |
| 19 | 3 | |    2 | 1.47 | 0.667 | o | 30.3 | o |
| 20 | 3 | |    2.5 | 1.47 | 0.833 | o | 30.0 | o |
| 21 | 3 | |    3 | 1.47 | 1.000 | o | 29.5 | o |
| 22 | 3 | |    3.5 | 1.47 | 1.167 | Δ | 28.8 | Δ |

First, referring to specimens 1 to 10 of Table 1, the conventional Comparative Example using Zr as the second subcomponent will be described.

As shown in specimens 1 to 4, as a result of setting the content of Zr as the second subcomponent to 0.29 mol, setting the content of Si as the third subcomponent to 2.64 mol, and gradually decreasing the content of Mn as the first subcomponent from 4.5 mol to 2 mol, it was found that the microstructural uniformity was improved, but the high temperature reliability was rather deteriorated.

In addition, as shown in specimens 5 to 8, as a result of setting the content of Zr as the second subcomponent to 0.29 mol, gradually decreasing the content of Mn as the first subcomponent from 4.5 mol to 2 mol, and setting the content of Si as the third subcomponent down to 1.47 mol, it was found that the body compactness was not improved, and also the high temperature reliability was rather deteriorated.

In addition, as shown in specimens 9 and 10, as a result of setting the content of Mn as the first subcomponent to 3 mol, setting the content of Si as the third subcomponent down to 1.47 mol, and increasing the content of Zr as the second subcomponent from 1 mol to 1.5 mol, the body compactness was not greatly changed, but the microstructural uniformity was improved, and high temperature reliability was not greatly changed.

Considering the above, in the case of the Comparative Example (specimens 1 to 10) using Zr as the second subcomponent, it was found that it is difficult to greatly improve the high temperature reliability even in the case of adjusting the contents of the first subcomponent, the second subcomponent and the third subcomponent.

Specimens 11 to 16 are directed to an exemplary embodiment of the present disclosure, and used Dy as the second subcomponent.

Referring to specimens 11 to 16, it was found that there is no significant difference in the dielectric constant as compared with the above Comparative Example using Zr.

In addition, as a result of setting the content of Mn as the first subcomponent to 3 mol, setting the content of Si as the third subcomponent to 1.47 mol, and gradually increasing the content of Dy as the second subcomponent from 1 mol to 3.5 mol, it was found that from specimen 12 having the content of Dy of 1.5 mol, the grain growth was suppressed, thereby improving the body compactness and the microstructural uniformity, and also improving the high temperature reliability.

However, in the case of specimen 12, the high temperature reliability was found to be Δ, and in the case of specimen 16 having the ratio of the content of Dy as the second subcomponent to the content of Mn as the first subcomponent being more than 1.000, it was found that a secondary phase of pyrochloride ($Dy_2Ti_2O_7$) was formed, so that the microstructural uniformity and the high temperature reliability were rather deteriorated as compared with specimen 15.

Therefore, the ratio of Dy/Mn at which the body compactness and the microstructural uniformity are improved and the high temperature reliability is good may be considered as being 0.6 or more and 1.0 or less.

Specimens 17 to 22 are directed to another exemplary embodiment of the present disclosure, and used Y as the second subcomponent.

Referring to specimens 17 to 22, it was found that there is no significant difference in the dielectric constant as compared with the above Comparative Example using Zr.

In addition, identically to an exemplary embodiment, the content of Mn as the first subcomponent was set to 3 mol, and the content of Si as the third subcomponent was set to 1.47 mol. Further, as a result of gradually increasing the content of Y as the second subcomponent from 1 mol to 3.5 mol, it was found that from specimen 18 having the content of Y of 1.5 mol, the grain growth was suppressed, thereby improving the body compactness and the microstructural uniformity, and also improving the high temperature reliability.

However, in the case of specimen 18, the high temperature reliability was found to be Δ, and in the case of specimen 22 having the ratio of the content of Y as the second subcomponent to the content of Mn as the first subcomponent being more than 1.000, it was found that a secondary phase of pyrochloride ($Y_2Ti_2O_7$) was formed, so that the microstructural uniformity and the high temperature reliability were rather deteriorated as compared with specimen 21.

Therefore, the ratio of Y/Mn at which the body compactness and the microstructural uniformity are improved and the high temperature reliability is good may be considered as being 0.6 or more and 1.0 or less.

As described above, when Dy or Y is used as the second subcomponent, and the dielectric composition is prepared in a range of satisfying the exemplary embodiment of the present disclosure, the high dielectric constant and high reliability may be secured even in the case of decreasing the thickness of the dielectric layer.

According to the exemplary embodiments of the present disclosure, an electronic component which satisfies C0G properties and secures reliability even in the case that a thickness of the dielectric layer is 1.5 um or less may be manufactured.

While exemplary embodiments have been shown and described above, it will be apparent to those skilled in the art that modifications and variations could be made without departing from the scope of the present invention as defined by the appended claims.

What is claimed is:

1. A dielectric composition comprising:
a base material powder including $(Ca_{1-x}Sr_x)(Zr_{1-y}Ti_y)O_3$ ($0<x\leq0.7$, $0<y\leq0.03$);
a first subcomponent including at least one selected from the group of an oxide of manganese (Mn) and a carbonate of manganese (Mn);
a second subcomponent including at least one selected from the group of an oxide of yttrium (Y) and a carbonate of yttrium (Y), wherein a content of the second subcomponent is within a range from 2 to 3 mol, based on 100 mol of the base material powder; and
a third subcomponent including at least one selected from the group of an oxide of silicon (Si) and a carbonate of silicon (Si).

2. The dielectric composition of claim 1, wherein a ratio of a content of the second subcomponent to a content of the first subcomponent is within a range from 0.6 to 1.0.

3. A dielectric composition comprising:
a base material powder including $(Ca_{1-x}Sr_x)(Zr_{1-y}Ti_y)O_3$ ($0<x\leq0.7$, $0<y\leq0.03$);
a first subcomponent including at least one selected from the group of an oxide of manganese (Mn) and a carbonate of manganese (Mn);
a second subcomponent including dysprosium (Dy), wherein a content of the second subcomponent is within a range from 2 to 3 mol, based on 100 mol of the base material powder; and
a third subcomponent including at least one selected from the group of an oxide of silicon (Si) and a carbonate of silicon (Si).

4. The dielectric composition of claim 3, wherein a ratio of a content of the second subcomponent to a content of the first subcomponent is within a range from 0.6 to 1.0.

5. An electronic component comprising:
a body including a plurality of dielectric layers and an internal electrode; and
an external electrode disposed to be connected to the internal electrode in the body,
wherein the dielectric layer includes: a base material powder including $(Ca_{1-x}Sr_x)(Zr_{1-y}Ti_y)O_3$ ($0<x\leq0.7$, $0<y\leq0.03$); a first subcomponent including at least one selected from the group of an oxide of manganese (Mn) and a carbonate of manganese (Mn); a second subcomponent including yttrium (Y), wherein a content of the second subcomponent is within a range from 2 to 3 mol, based on 100 mol of the base material powder; and a third subcomponent including at least one selected from the group of an oxide of silicon (Si) and a carbonate of silicon (Si).

6. The electronic component of claim 5, wherein, in the dielectric layer, a ratio of a content of the second subcomponent to a content of the first subcomponent is within a range from 0.6 to 1.0.

7. The electronic component of claim 5, wherein the internal electrode includes at least one selected from the group of nickel (Ni) and a Ni alloy.

8. An electronic component comprising:
a body including a plurality of dielectric layers and an internal electrode; and
an external electrode disposed to be connected to the internal electrode in the body,
wherein the dielectric layer includes: a base material powder including $(Ca_{1-x}Sr_x)(Zr_{1-y}Ti_y)O_3$ ($0<x\leq0.7$, $0<y\leq0.03$); a first subcomponent including at least one selected from the group of an oxide of manganese (Mn) and a carbonate of manganese (Mn); a second subcomponent including dysprosium (Dy), wherein a content of the second subcomponent is within a range from 2 to 3 mol, based on 100 mol of the base material powder; and a third subcomponent including at least one selected from the group of an oxide of silicon (Si) and a carbonate of silicon (Si).

9. The electronic component of claim 8, wherein, in the dielectric layer, a ratio of a content of the second subcomponent to a content of the first subcomponent is within a range from 0.6 to 1.0.

10. The electronic component of claim 8, wherein the internal electrode includes at least one selected from the group of nickel (Ni) and a Ni alloy.

* * * * *